United States Patent [19]
Mobley

[11] Patent Number: 4,581,439
[45] Date of Patent: Apr. 8, 1986

[54] POLYPHENYLENE OXIDE PREPARATION IN AN AQUEOUS DISPERSION

[75] Inventor: David P. Mobley, Schenectady, N.Y.

[73] Assignee: General Electric Company, Schenectady, N.Y.

[21] Appl. No.: 614,623

[22] Filed: May 29, 1984

[51] Int. Cl.$^4$ .............................................. C08G 65/44
[52] U.S. Cl. .................................. 528/215; 528/212; 528/214; 528/216; 528/217; 528/218
[58] Field of Search .......................... 528/212, 214-218

[56] References Cited
U.S. PATENT DOCUMENTS

| | | |
|---|---|---|
| 4,058,504 | 11/1977 | Yonemitsu et al. ................. 528/214 |
| 4,083,828 | 4/1978 | Olander ............................... 528/214 |
| 4,184,034 | 1/1980 | Olander ............................... 528/212 |
| 4,211,857 | 7/1980 | Sugio et al. ......................... 528/212 |
| 4,335,234 | 6/1982 | Olander et al. ..................... 528/214 |
| 4,396,757 | 8/1983 | Ragimov et al. .................... 528/214 |
| 4,427,594 | 1/1984 | Banucci et al. ...................... 528/212 |

FOREIGN PATENT DOCUMENTS 61691 10/1982 European Pat. Off. .

Primary Examiner—Lester L. Lee
Attorney, Agent, or Firm—William H. Pittman; James C. Davis, Jr.; James Magee, Jr.

[57] ABSTRACT

Polyphenylene oxides are prepared by the catalytic reaction of oxygen with at least one monohydroxyaromatic compound in a system which includes an organic solvent and an aqueous phase comprising a solution of at least one inorganic halide salt, preferably sodium bromide. This system enables the reaction to be conducted in the presence of the aqueous phase without deactivating the oxidative coupling catalyst. This system preferably also contains a minor amount of at least one surfactant selected from the group consisting of cationic surfactants having an HLB within the range of about 12-15 and amphoteric surfactants. The presence of a surfactant facilitates polymer recovery by promoting formation of readily filterable solid polymer particles in the aqueous system.

19 Claims, 4 Drawing Figures

FIG. I
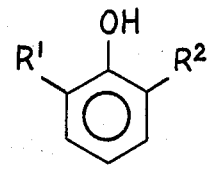
FIG. II
$R^3NH-R^4-NHR^5$
FIG. III
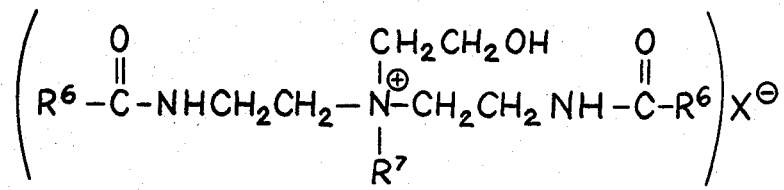
FIG. IV
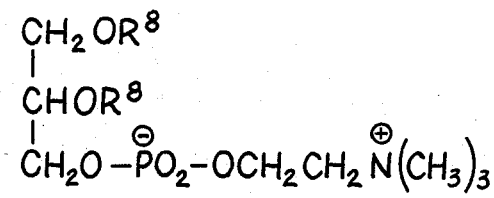

POLYPHENYLENE OXIDE PREPARATION IN AN AQUEOUS DISPERSION

This invention relates to the preparation of polyphenylene oxides, and more particularly to a method for the preparation of high molecular weight polyphenylene oxides in excellent yield in an aqueous system.

Polyphenylene oxides, also known as polyphenylene ethers, are an important class of resins for industrial use. They are typically prepared by the oxidative coupling of monohydroxyaromatic compounds in the presence of a metal-containing catalyst. For the most part, the oxidative coupling reaction is effected in an organic system including a solvent for the reactants, which typically also dissolves the product polymer.

The presence of such a solvent complicates the separation of the polyphenylene oxide from the reaction mixture. Normally, separation must be effected by adding a non-solvent for the polymer and separating the precipitated polymer. Moreover, the use of oxygen in an organic solvent system creates a potential safety hazard which requires careful shielding of the reaction vessel, typically by enclosing it in a space to which access is restricted.

These problems could be overcome to some degree by conducting the oxidative coupling reaction in a system comprising a dispersion of the organic phase in a substantial amount of water. In addition to minimizing the safety problem, the presence of water would aid the recovery of the polyphenylene oxide since the latter does not dissolve in the former. Thus, it would be a relatively simple matter to remove the organic solvent by evaporation, optionally at reduced pressure, whereupon the polyphenylene oxide separates as a solid and may be easily removed from the aqueous system.

A major obstacle to conducting the oxidative coupling in aqueous dispersion has been the sensitivity of the oxidative coupling catalysts to water. Many of such catalysts, including the commonly used copper-amine systems, undergo deactivation even upon contact with the relatively minor amounts of water formed in the polymerization reaction. Other catalysts, such as those disclosed in U.S. Pat. No. 4,028,341, are not rapidly deactivated by water of reaction but do not function properly in the presence of larger quantities of water. A system disclosed in European patent application No. 61,691, which includes water and a quaternary phosphonium or ammonium salt, is allegedly satisfactory but in practice has been found to function erratically at best.

A principal object of the present invention, therefore, is to provide a safer and more convenient method for polyphenylene oxide preparation and isolation.

A further object is to provide an oxidative coupling method for polyphenylene oxide preparation in aqueous dispersion.

Other objects will in part be obvious and will in part appear hereinafter.

In its most general sense, the present invention comprises an improvement in a method for preparing and recovering polyphenylene oxides by the catalytic reaction of oxygen with at least one monohydroxyaromatic compound in a system which includes an organic solvent, said improvement comprising incorporating in said system an aqueous phase comprising a solution of at least one inorganic halide salt, the weight ratio of the aqueous to the organic phase being at least about 0.8:1 and the concentration of said halide in said aqueous phase being about 1–5% by weight.

Typical monohydroxyaromatic compounds (hereinafter sometimes referred to as "phenols" for brevity) useful in the method of this invention are those having the formula in FIG. I, wherein $R^1$ is a lower primary alkyl group and $R^2$ is a lower primary or secondary alkyl group, the word "lower" meaning that it contains up to 7 carbon atoms. Examples of lower primary alkyl groups are methyl, ethyl, n-propyl, b-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 3-pentyl. Preferably, $R^1$ and $R^2$ are straight chain rather than branched. since the polyphenylene oxides in which $R^1$ and $R^2$ are other than methyl generally have no more desirable properties than those in which $R^1$ and $R^2$ are both methyl, and since 2,6-xylenol is the most readily available and cheapest 2,6-dialkylphenol, its use is preferred. The polyphenylene oxide obtained is then poly(2,6-dimethyl-1,4-phenylene oxide). Other suitable phenols are disclosed in the aforementioned U.S. Pat. No. 4,028,341 (hereinafter '341), as well as in the following U.S. patents;

U.S. Pat. No. 3,306,874 (hereinafter '874)
U.S. Pat. No. 3.306,875 (hereinafter '875)
U.S. Pat. No. 3,914,266 (hereinafter '266).

The disclosures of all of these patents are incorporated by reference herein.

Various catalysts have been disclosed for the preparation of polyphenylene oxides, and any of them can be used in the process of this invention. Reference is made, for example, to the aforementioned patents and to U.S. Pat. No. 3,789,054 for disclosures of various suitable catalysts containing such metals as copper, cobalt and manganese. For the most part, however, the catalyst is a combination of copper (i.e., cuprous or cupric) ions, halide (i.e., chloride, bromide or iodide) ions and at least one amine.

The source of copper ion can be any of the cupric or cuprous salts disclosed in the '874 and '875 patents. See, for example, '874 from column 3, line 62 to column 4, line 61. The halide ion is preferably bromide, and its source can be any of those disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it form soluble complexes with the amine constituents of the catalyst or produces a soluble product under oxidative coupling conditions. When metal bromides other than the copper bromides are used, the particular metal used is merely one of choice. Since some of these materials (e.g., cobalt) from complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromine will brominate the phenol and simultaneously produce hydrogen bromide, again adjustments in the amount of amine may be necessary in such situations.

The currently preferred bromide source is HBr, which may conveniently be combined with the copper source as a solution of cuprous oxide in aqueous hydrobromic acid. The proportions of the copper and halide sources are generally such as to provide a mole ratio of phenol to copper of about 100–1500:1, preferably about 250–1000:1, and a mole ratio of halide to copper of at least about 3.5:1, usually less than 12:1 and preferably about 4–6:1.

The amine constituents of the catalyst mixture may be any of those disclosed in the '874, '875, '266 and '341 patents. Preferably, however, the amines comprise at least one secondary alkylene diamine and at least one tertiary monoamine.

The secondary alkylene diamine may be selected from those disclosed in the '341 patent, especially from column 6, line 44, to column 8, line 11. It generally has the formula in FIG. II, wherein each of $R^3$ and $R^5$ is a secondary or tertiary alkyl group and $R^4$ is a divalent hydrocarbon group, and wherein at least two and no more than three carbon atoms separate the two amino nitrogen atoms and the carbon atoms to which the amino nitrogens are attached are aliphatic. Preferably, there are only two carbon atoms separating the two amino nitrogens. The two or three carbon atoms separating the amino nitrogens can be either acyclic or cyclic carbon atoms. Typical examples of $R^4$ include ethylene, 1,2- and 1,3-propylene, 1,2-, 1,3- and 2,3-butylene, the various pentylene isomers having from two or three carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene and 1,2-cyclopentylene.

Typical examples of $R^3$ and $R^5$ include isopropyl and tertiary alkyl groups. The substituents on the α-carbon atoms can be straight or branched chain alkyl, cycloalkyl, aryl or alkaryl. Typical examples of groups $R^3$ and $R^5$ include those set forth in the '341 patent, column 8, lines 2–11, e.g., t-butyl, 2-methyl-2-butyl, etc. The currently preferred secondary alkylene diamine is N,N'-di-t-butylethylenediamine. The molar ratio of diamine to copper is usually about 0.4 ∝ 3.0:1.

The tertiary monoamine can be selected from those disclosed in the '341 patent; specific reference should be made to column 8, lines 12–33. It can be a heterocyclic amine or a trialkylamine characterized by having the amine nitrogen attached to at least two groups which have a small cross-sectional area. In the case of a trialkylamine, it is preferred that at least two of the alkyl groups be methyl with the third being a $C_{1-8}$ primary or $C_{3-8}$ secondary alkyl, and it is more preferred that the third substituent have no more than four carbon atoms. The currently preferred tertiary monoamine is dimethyl-n-butylamine. A molar ratio of tertiary amine to copper of about 10–100:1 is generally used, with the preferred range being about 20–60:1.

At least one secondary monoamine as disclosed in the '874 patent from column 4, line 62 to column 6, line 13 may optionally also be used. In addition to functioning as part of the caralyst and increasing the activity thereof, the secondary amine frequently increases the impact strength of the polymer, particularly in blends with other polymers such as polystyrenes. It is believed that the increase in impact strength is achieved by a crosslinking reaction similar to that disclosed in U.S. Pat. No. 4,054,553 at column 6, lines 28–60. The currently preferred secondary monoamines are dimethylamine and di-n-butylamine. When present, the secondary monoamine is generally used in a concentration up to about 3 and preferably about 0.5–2.0 mole percent of the phenol.

A phase transfer catalyst may also optionally be used in the reaction system (usually in the amount of about 0.1–2.0% by weight, based on phenol) as a reaction rate promoter. Useful phase transfer catalysts are disclosed in U.S. Pat. No. 3,988,297, hereby incorporated by reference; specific reference is made to column 2, lines 11–26, and column 3, lines 1–23. The currently preferred phase transfer catalyst is Adogen 464, which is a methyltrialkylammonium chloride wherein the alkyl groups have from 8 to 10 carbon atoms.

One or more organic solvents are also present in the reaction mixture. Typical solvents are disclosed in the '874, '875 and '341 patents. The function of the solvent is to provide a liquid phase in which both the phenol and catalyst are soluble. It need not, but preferably does, act as a solvent for the reaction products. Illustrative solvents are toluene and benzene; other inexpensive and readily available commercial solvents may also be used. The amount of solvent is most often adjusted to provide a phenol concentration therein of about 5–60% by weight, usually about 10–40% and preferably about 15–25%.

According to the present invention, the oxidative coupling reaction is conducted in a dispersed system which includes, in addition to the aforementioned constituents, an aqueous phase comprising a solution of at least one inorganic halide salt. The anionic species therein may be any halide atom, but for reasons of availability and particular suitability, chloride and bromide are preferred and chloride is especially preferred. The cationic species may be, for example, an alkali metal such as lithium, sodium or potassium; an alkaline earth metal such as magnesium or calcium; or a phosphorous-containing ion such as phosphonium, trimethylphosphonium or tetramethylphosphonium. In general, ammonium and amine-derived cations should be avoided because of their strong tendency to form complexes with the copper constituent of the catalyst. The most preferred salts are the alkali metal chlorides and bromides, especially sodium bromide. The concentration of the inorganic halide in the aqueous phase is about 1–5% by weight.

The weight ratio of the aqueous to the organic phase is at least about 0.8:1 and is usually no more than about 5:1. Preferably, it is about 1–3:1.

The oxidative coupling reaction is conducted conventionally and involves merely passing oxygen into the reaction mixture, usually with agitation such as stirring, at a temperature up to about 40° C. until no more heat is generated or the desired amount of oxygen is absorbed. The amount of oxygen generally used is about 0.5–1 mole per mole of phenol. If desired, the oxygen can be diluted with inert gases or air can be used, but the use of pure oxygen is preferred. Sub- or superatmospheric pressures can be used but are seldom if ever necessary.

The principal advantage of the present invention is the ability to conduct the reaction in the presence of the aqueous phase without deactivating the oxidative coupling catalyst. When the reaction has proceeded to the desired extend, conventional polymer recovery means, typically precipitation with a non-solvent such as methanol followed by separation of the precipitative polymer, may be used. However, in a preferred embodiment of the invention the solvent is removed by evaporation (typically distillation or vacuum evaporation, optionally as an azeotrope with water) whereupon the polyphenylene oxide separates from the aqueous phase and may be easily recovered.

In another preferred embodiment of the invention, the system also contains a minor amount of at least one surfactant selected from the group consisting of cationic surfactants having an HLB within the range of about 12-15 and amphoteric surfactants. The presence of a surfactant facilities polymer recovery upon evaporation of the organic solvent by promoting formation of readily filterable solid polymer particles in the aqueous system. Thus, the use of a surfactant (generally in the amount of about 0.2-1.5% by weight of the aqueous phase) is strongly preferred when this method of isolation is used.

The surfactants which are useful in the method of this invention are in two classes. The first class includes cationic surfactants having an HLB (hydrophile-lipophile balance) within the range of about 11.5-15. Many such surfactants are known in the art. The solubility properties thereof are not of great importance; both water-soluble and substantially water-insoluble surfactants are useful, so long as they promote the formation of easily filterable polymer particles.

A first preferred class of cationic surfactants consists of alkyltrimethylammonium salts (especially halides and preferably chlorides) in which the alkyl groups contain an average of about 12-25 and especially about 15-20 carbon atoms. An illustrative surfactant in this class is "Arquad T-50", an alkyltrimethylammonium chloride available from Armak Company wherein the alkyl group is derived from tallow and contains an average of 16-18 carbon atoms. It has an HLB of 14.2 and is available as a 50% (be weight) solution in water and isopropanol.

A second preferred class of cationic surfactants consists of ethoxylated quaternized diethylenetriamine bisamides of fatty acids containing an average of about 12-25 and preferably about 12-20 carbon atoms. Surfactants of this type are disclosed in U.S. Pat. No. 3,658,718, the disclosure of which is incorporated by reference herein. They may be represented by the formula in FIG. III, wherein each $R^6$ is an alkyl or alkenyl radical derived from the fatty acid; $R^7$ is at least one of hydrogen, methyl, hydroxyethyl and hydroxypropyl; and X is halogen and preferably chlorine.

Particularly preferred surfactants of this type are those in which $R^6$ has an average of 12-20 carbon atoms, $R^7$ is methyl or a mixture of methyl and hydroxyethyl and X is chlorine. An especially suitable specific surfactant is "Emulsifier Five", which is available from Tomah Products, Inc., as a 75% (by weight) solution in isopropanol.

Another category of suitable surfactants consists of amphoteric surfactants. These contain cationic groups such as those present in the cationic surfactants, and in addition anionic groups which form zwitterions with said cationic groups. A particularly preferred class of amphoteric surfactants consists of the mixed phosphate esters of glycerides (especially diglycerides) and alkoxytrimethylammonium compounds such as choline, especially mixed esters in which the glyceride fatty acid moieties contain about 12-25 and most often about 15-20 carbon atoms. The most common amphoteric surfactant of this type is lecithin, a naturally occurring mixture of compounds having the formula in FIGURE IV, wherein each $R^8$ is independently an alkyl or alkenyl radical containing about 16-18 carbon atoms. The HLB of lecithin is about 8.

The oxidative coupling reaction is exothermic and is usually conducted with external cooling so as to maintain the reaction mixture at a temperature in the range of about 10°-60° C., usually 20°-55° C. and preferably 30°-40° C., until the desired degree of conversion has been attained. Normally, the highest attainable degree of conversion is desired and the weight average molecular weight of the product polyphenylene oxide will be from about 5,000 to 75,000 or even more.

In another preferred embodiment of the invention, the non-gaseous constituents (i.e., phenol, catalyst components, solvent and phase transfer catalyst when used) are pre-mixed in an inert (e.g., nitrogen or helium) atmosphere to form a homogeneous mixture which is then contacted with oxygen to effect polymerization. This pre-mixing step in its more general application is disclosed and claimed in copending, commonly assigned application Ser. No. 479,057, filed Mar. 25, 1983. It promotes formation of the actual catalyst species under extremely favorable conditions, especially when the preferred copper-bromide-amine catalyst is used.

The method of this invention is usually conducted in a batch process, but its employment in a continuous process is within the scope of the invention. An illustrative continuous system is disclosed in copending, commonly assigned application Ser. No. 479,066, filed Mar. 25, 1983. When a batch process is used with a copper-halideamine catalyst and a pre-mixing step, the copper and halide ions should be added last in said step in order that they will be solublized by complex formation with the amines. In a continuous process, no special addition order is necessary since each catalyst ingredient is always present in the pre-mix vessel.

The method of this invention is illustrated by the following examples. Intrinsic viscosities were measured in chloroform at 25° C.

EXAMPLE 1

To a mixture of 139 grams of toluene, 36 grams of 2,6-xylenol, 0.19 gram of N,N'-dibutylethylenediamine, 1.31 grams of dimethyl-n-butylamine, 0.38 grams of di-n-butylamine and 0.051 gram of "Adogen 464" was added, with stirring, 1.09 grams of a solution of 5.90 grams of cuprous oxide in 50 ml. of 48% aqueous hydrogen bromide. The mixture was agitated for several minutes under nitrogen until dissolution of the copper-bromide solution was complete. Two hundred milliliters of an aqueous solution containing 4 grams of sodium bromide was then added and oxygen was passed through at 0.4 SCFH, with stirring, for 100 minutes. The mixture was cooled to maintain a maximum temperature of 33° C. for 60 minutes and was then heated to a maximum temperature of 40° C. for the remaining 40 minutes. The polyphenylene oxide was then precipitated by addition of methanol, filtration and drying. The intrinsic viscosity thereof was 0.46 dl./g.

EXAMPLE 2

The procedure of Example 1 was repeated, except that the reaction mixture contained 0.72 gram of "Adogen 464" and was maintained at 33° C. for 50 minutes and at 40° C. for 20 minutes. The resulting polyphenylene oxide had an intrinsic viscosity of 0.64 dl./g. By contrast, a polymer prepared by the same method, excpet that sodium bromide was absent and the residence time at 40° C. was 10 minutes, had an intrinsic viscosity of 0.11 dl./g.

EXAMPLE 3

The procedure of Example 1 was repeated, except that the reaction mixture contained 62 grams of toluene, 1.34 grams of dimethyl-n-butylamine and 360 ml. of an aqueous solution containing 14.4 grams of sodium bromide, and the reaction time and maximum reaction temperature were 75 minutes and 33° C., respectively. The product had an intrinsic viscosity of 0.50 dl./g.

EXAMPLE 4

To a mixture of 139 grams of toluene, 36 grams of 2,6-xylenol, 0.14 gram of N,N'-dibutylethylenediamine, 1.31 grams of dimethyl-n-butylamine, 0.38 gram of di-n-butylamine and 0.72 gram of "Adogen 464" was added, with stirring, 0.80 gram of the cuprous oxide-hydrogen bromide solution of Example 1. The mixture was agitated for several minutes under nitrogen until dissolution of the copper-bromide solution was complete. Two hundred milliliters of an aqueous solution containing 4 grams of sodium bromide and 2.7 grams of "Emulsifier Five" was then added and oxygen was passed through at 0.4 SCFH, with stirring, for 60 minutes with cooling to maintain a maximum temperature of 33° C. The mixture was then vacuum stripped with stirring for 90 minutes at 40°-55° C. to remove a toluene-water mixture. The polyphenylene oxide precipitated in the form of fine particles and was removed by filtration and dried in a vacuum oven. It had an intrinsic viscosity of 0.55 dl./g.

EXAMPLE 5

The procedure of Example 4 was repeated, except that the "Adogen 464" was omitted and the mixture was vacuum stripped for 100 minutes. The resulting polyphenylene oxide had an intrinsic viscosity of 0.40 dl./g.

EXAMPLE 6

The procedure of Example 4 was repeated, except that the "Emulsifier Five" was replaced by 4 grams of "Arquad T-50", the reaction time was 70 minutes and the mixture was vacuum stripped for 75 minutes. The resulting polyphenylene oxide had an intrinsic viscosity of 0.60 dl.g.

EXAMPLE 7

The procedure of Example 1 was repeated, except that the "Emulsifier Five" was omitted, the toluene solution additionally contained 0.5 gram of lecithin, the polymerization was carried out at a maximum temperature of 33° C. for 50 minutes and 40° C. for 40 minutes, and the mixture was vacuum stripped for 60 minutes. The resulting polyphenylene oxide had an intrinsic viscosity of 0.53 dl./g.

What is claimed is:

1. In a method for preparing and recovering polyphenylene oxides by the catalytic reaction of oxygen which includes an organic solvent, the improvement which comprises incorporating in said system an aqueous phase comprising a solution of at least one alkali metal chloride or bromide salt, the weight ratio of the aqueous to the organic phase being at least about 0.8:1 and the concentration of said salt in said aqueous phase being about 1–5% by weight.

2. A method according to claim 1 wherein the catalyst is a combination of copper ions halide ions and at least one amine.

3. A method according to claim 2 wherein the weight ratio of the aqueous to the organic phase is about 1–3:1.

4. A method according to claim 3 wherein the halide in the catalyst mixture is bromide, the amine constituents thereof comprise at least one secondary alkylene diamine and at least one tertiary monoamine, and the solvent is toluene.

5. A method according to claim 4 wherein the secondary alkylene diamine is N,N'-di-t-butylethylenediamine and the tertiary monoamine is dimethyl-n-butylamine.

6. A method according to claim 4 which includes the step of removing the solvent by evaporation, whereupon the polyphenylene oxide separates from the aqueous phase.

7. A method according to claim 6 wherein the chloride or bromide salt is sodium bromide.

8. A method according to claim 7 wherein the catalyst mixture additionally contains at least one secondary monoamine.

9. A method according to claim 8 wherein the monohydroxyaromatic compound is 2,6-xylenol.

10. A method according to claim 9 wherein the secondary alkylene diamine is N,N'-di-t-butylethylenediamine, the tertiary monoamine is dimethyl-n-butylamine, and the secondary monoamine is dimethylamine or di-n-butylamine.

11. A method according to claim 6 wherein the system also contains a minor amount of at least one surfactant selected from the group consisting of cationic surfactants having an HLB within the range of about 12–15 and amphoteric surfactants.

12. A method according to claim 11 wherein the amount of surfactant is about 0.2–1.5% by weight of the aqueous phase.

13. A method according to claim 12 wherein the surfactant is an alkyltrimethylammonium salt in which the alkyl groups contain an average of about 12–25 carbon atoms.

14. A method according to claim 13 wherein the alkyltrimethylammonium salt is a chloride.

15. A method according to claim 12 wherein the surfactant has the formula in FIG. III, wherein each $R^6$ is an alkyl or alkenyl radical derived from a fatty acid containing an average of about 12–25 carbon atoms; $R^7$ is at least one of hydrogen, methyl, hydroxyethyl and hydroxypropyl; and X is halogen.

16. A method according to claim 15 wherein $R^7$ is methyl or a mixture of methyl and hydroxyethyl and X is chlorine.

17. A method according to claim 12 wherein the surfactant is lecithin.

18. A method according to claim 1 wherein the non-gaseous constituents are pre-mixed in an inert atmosphere to form a homogenous mixture which is then contacted with oxygen to effect polymerization.

19. A method according to claim 11 wherein the non-gaseous constituents are pre-mixed in an inert atmosphere to form a homogenous mixture which is then contacted with oxygen to effect polymerization.

* * * * *

UNITED STATES PATENT AND TRADEMARK OFFICE
CERTIFICATE OF CORRECTION

PATENT NO. :   4,581,439

DATED      :   April 8, 1986

INVENTOR(S):   David P. Mobley

It is certified that error appears in the above-identified patent and that said Letters Patent is hereby corrected as shown below:

Column 3, line 46, the symbol between "0.4" and "3.0:1" should be a hyphen.  Column 5, line 39, "be" should read --by--.  Column 7, lines 2-3, "excpet" should read --except--; after line 62, the following should appear:  --with at least one monohydroxyaromatic compound in a system--.

Signed and Sealed this

Eighth Day of July 1986

[SEAL]

Attest:

DONALD J. QUIGG

Attesting Officer

Commissioner of Patents and Trademarks